(12) United States Patent
Seetharaman et al.

(10) Patent No.: US 8,817,629 B2
(45) Date of Patent: Aug. 26, 2014

(54) METHOD FOR ROUTING-ASSISTED TRAFFIC MONITORING

(75) Inventors: Srinivasan Seetharaman, Mountain View, CA (US); Saqib Raza, Santa Clara, CA (US); Chen-Nee Chuah, Davis, CA (US); Guanyao Huang, Davis, CA (US); Jatinder Pal Singh, Mountain View, CA (US)

(73) Assignees: Deutsche Telekom AG, Bonn (DE); The Regents of the University of California, Oakland, CA (US)

( * ) Notice: Subject to any disclaimer, the term of this patent is extended or adjusted under 35 U.S.C. 154(b) by 187 days.

(21) Appl. No.: 13/039,531

(22) Filed: Mar. 3, 2011

(65) Prior Publication Data

US 2011/0267954 A1 Nov. 3, 2011

Related U.S. Application Data

(60) Provisional application No. 61/314,329, filed on Mar. 16, 2010.

(51) Int. Cl.
- *H04L 12/733* (2013.01)
- *H04L 12/725* (2013.01)
- *H04L 12/26* (2006.01)
- *H04L 12/813* (2013.01)
- *H04L 12/56* (2006.01)

(52) U.S. Cl.
CPC ............ *H04L 45/124* (2013.01); *H04L 43/022* (2013.01); *H04L 43/12* (2013.01); *H04L 45/18* (2013.01); *H04L 45/22* (2013.01); *H04L 47/20* (2013.01)
USPC ...................................... 370/236.2; 370/241

(58) Field of Classification Search
CPC ................... H04L 45/18; H04L 45/22; H04L 45/30–45/306; H04L 43/02–43/028
USPC ......................................... 370/238, 392, 241
See application file for complete search history.

(56) References Cited

U.S. PATENT DOCUMENTS

| 2003/0162499 A1 | 8/2003 | Jonsson |
| 2004/0052300 A1 * | 3/2004 | Lopez-Estrada .............. 375/130 |

(Continued)

FOREIGN PATENT DOCUMENTS

EP 1164754 A1 12/2001

OTHER PUBLICATIONS

European Patent Office, International Search Report in International Patent Application No. PCT/EP2011/001289 (May 13, 2011).

(Continued)

*Primary Examiner* — Hoon J Chung
*Assistant Examiner* — Yaotang Wang
(74) *Attorney, Agent, or Firm* — Leydig, Voit & Mayer, Ltd.

(57) ABSTRACT

A method for routing-assisted traffic monitoring includes providing a set of flows, each flow having an associated ingress routing device and an associated egress routing device. A controller determines a micro-flowset routing for the set of flows, the micro-flowset routing defining which of a set of directed links connecting a plurality of routing devices are used to route each of the flows from the respective ingress routing device to the respective egress routing device. The controller transmits flow information to at least a first routing device of the plurality of routing devices according to the micro-flowset routing, the flow information defining which of the set of directed links are to be used to route at least one flow entering the first routing device to a second routing device of the plurality of routing devices.

10 Claims, 7 Drawing Sheets

(56) References Cited

U.S. PATENT DOCUMENTS

| | | | |
|---|---|---|---|
| 2006/0217923 A1* | 9/2006 | Ma et al. | 702/179 |
| 2007/0047446 A1 | 3/2007 | Dalal et al. | |
| 2007/0091811 A1* | 4/2007 | Thubert et al. | 370/238 |
| 2007/0140128 A1 | 6/2007 | Klinker et al. | |
| 2007/0271374 A1* | 11/2007 | Shomura et al. | 709/224 |
| 2010/0103937 A1* | 4/2010 | O'Neil | 370/392 |
| 2010/0157809 A1* | 6/2010 | Duffield et al. | 370/241 |

OTHER PUBLICATIONS

The Open Flow Switch Specification version 1.0.0, published on Dec. 31, 2009 by the OpenFlow Switch Consortium, pp. 1-42.

C. Chaudet, E. Fleury, I. G. Lassous, H. Rivano, and M-E. Voge, "Optimal positioning of active and passive monitoring devices," in Proceedings of ACM CoNEXT, 2005, pp. 71-82.

K. Suh and Y. Guo and J. Kurose and D. Towsley, "Locating network monitors: Complexity, heuristics and coverage," in Proceedings of IEEE INFOCOM, Mar. 2005, pp. 351-361.

G. R. Cantieni, G. Iannaccone, C. Barakat, C. Diot, and P. Thiran, "Reformulating the monitor placement problem: Optimal network-wide sampling," in Proceedings of ACM CoNEXT, 2006, pp. 1-7.

S.Raza, G. Huang, C-N. Chuah, S. Seetharaman, and J. P. Singh, "MeasuRouting: A Framework for Routing Assisted Traffic Monitoring," in Proc. IEEE INFOCOM, San Deigo, USI, Mar. 2010, pp. 1-9.

"OSPF," http://tools.ietf.org/html/rfc2328, Apr. 1998, pp. 1-245.

"IS-IS," http://tools.ietf.org/html/rfc1142, Feb. 1990, pp. 1-665.

C. Wiseman et al., "A remotely accessible network processor-based router for network experimentation," in Proceedings of the 4th ACM/IEEE ANCS, 2008, pp. 20-29.

R. Morris, E. Kohler, J. Jannotti, and M. F. Kaashoek, "The Click modular router," in Proceedings of the 17th ACM SOSP, Dec. 1999, pp. 217-231.

B. Fortz and M. Thorup, "Internet TE by Optimizing OSPF Weights," in Proceedings of IEEE INFOCOM, Mar. 2000, pp. 1-10.

A. Medina, N. Taft, S. Battacharya, C. Diot, and K. Salamatian, "Traffic matrix estimation: Existing techniques compared and new directions," in Proceedings of ACM SIGCOMM, Aug. 2002, pp. 1-14.

N. Spring, R. Mahajan, and T. Anderson, "Quantifying the Causes of Path Inflation," in Proceedings of ACM SIGCOMM, 2003, pp. 113-124.

Y. Ohara, S. Imahori, and R. V. Meter, "MARA: Maximum alternative routing algorithm," in Proceedings of IEEE INFOCOM, Apr. 2009., pp. 1-9.

F. Yu, R. H. Katz, and T. V. Lakshman, "Gigabit rate packet patternmatching using tcam," in Proceedings of IEEE ICNP, 2004, pp. 174-183.

S. Dharmapurikar, P. Krishnamurthy, Todd Sproull, and John Lockwood, "Deep packet inspection using parallel bloom filters," in IEEE Micro, 2003, pp. 1-8.

"The abilene network," http://www.internet2.edu, retrieved on Apr. 19, 2011, pp. 1-2.

K. C. Claffy, G. C. Polyzos, and H-W Braun, "Application of sampling methodologies to network traffic characterization," in Proceedings of ACM SIGCOMM, 1993, pp. 1-10.

B-Y. Choi and S. Bhattacharyya, "On the Accuracy and Overhead of Cisco Sampled NetFlow," in Proceedings of ACM SIGMETRICS Workshop on Large Scale Network Inference (LSNI), Jun. 2005, pp. 1-6.

N. Duffield, C. Lund, and M. Thorup, "Predicting Resource Usage and Estimation Accuracy in an IP Flow Measurement Collection Infrastructure," in Proceedings of ACM SIGCOMM, 2003, pp. 179-191.

C. Estan, K. Keys, D. Moore, and G. Varghese, "Building a Better NetFlow," in Proceedings of ACM SIGCOMM, 2004, pp. 1-12.

C. Estan and G. Varghese, "New directions in traffic measurement and accounting: Focusing on the elephants, ignoring the mice," ACM Transactions on Computer Systems, vol. 21, No. 3, Aug. 2003, pp. 270-313.

N. Hohn and D. Veitch, "Inverting sampled traffic," in Proceedings of ACM SIGCOMM, 2003, pp. 1-12.

R. Kompella and C. Estan, "The Power of Slicing in Internet Flow Measurement," in Proceedings of ACM SIGCOMM, 2005, pp. 105-118.

A. Kumar, M. Sung, J. Xu, and J. Wang, "Data streaming algorithms for efficient and accurate estimation of flow size distribution," in Proceedings of ACM SIGMETRICS, 2004, pp. 177-188.

Y. Zhang, M. Roughan, C. Lund, and D. Donoho, "An Information-Theoretic Approach to Traffic Matrix Estimation," in Proceedings of ACM SIGCOMM, 2003, pp. 301-312.

X. Li, F. Bian, M. Crovella, C. Diot, R. Govindan, G. Iannaccone, and A. Lakhina, "Detection and Identification of Network Anomalies Using Sketch Subspaces," in Proceedings of ACM Internet Measurement Conference, 2006, pp. 1-6.

J. Mai, C-N. Chuah, A. Sridharan, T. Ye, and H. Zang, "Is sampled data sufficient for anomaly detection?," in Proceedings of ACM IMC, 2006, pp. 1-12.

A. Ramachandran, S. Seetharaman, N. Feamster, and V. Vazirani, "Fast Monitoring of Traffic Subpopulations," in Proceedings of ACM Internet Measurement Conference, 2008, pp. 1-14.

H. V. Madhyastha and B. Krishnamurthy, "A Generic Language for Application-Specific Flow Sampling," ACM Computer Communication Review, vol. 38, No. 2, Apr. 2008, pp. 1-9.

L. Yuan, C-N. Chuah, and P. Mohapatra, "ProgME: Towards Programmable Network MEasurement," in Proceedings of ACM SIGCOMM, 2007. pp. 1-12.

M. R. Sharma and J. W. Byers, "Scalable Coordination Techniques for Distributed Network Monitoring," in Proceedings of Passive and Active network Measurement (PAM) workshop, Apr. 2005, pp. 1-4.

V. Sekar, M. K. Reiter, W. Willinger, H. Zhang, R. R. Kompella, and D. G. Andersen, "CSAMP: A System for Network-Wide Flow Monitoring," in Proceedings of USENIX NSDI, 2008, pp. 1-14.

\* cited by examiner

METHOD FOR ROUTING-ASSISTED TRAFFIC MONITORING

CROSS-REFERENCE TO RELATED APPLICATIONS

This patent application claims the benefit of U.S. Provisional Patent Application No. 61/314,329, filed Mar. 16, 2010, entitled "A Method for Routing-Assisted Traffic Monitoring," which is herein incorporated by reference in its entirety.

FIELD

The present invention relates generally to monitoring transit traffic at one or more points in a network, and more particularly but not exclusively, to an apparatus, method, system, and manufacture for routing traffic sub-populations over fixed monitoring locations.

BACKGROUND

Previous efforts to monitor network traffic have focused on the optimal deployment of monitoring infrastructure in operational networks for accurate and efficient measurement of network traffic. Such deployment involves both monitoring infrastructure placement as well as configuration decisions. An example of the former includes choosing the interfaces at which to install monitoring equipment, e.g., DAG® cards, and the latter includes tuning the sampling rate and sampling scheme used by the monitoring equipment. The optimal placement and configuration of monitoring infrastructure for a specific measurement objective typically assumes prior knowledge of the traffic characteristics. However, traffic characteristics and measurement objectives may evolve dynamically, potentially rendering a previously determined solution suboptimal.

In a simple scenario, certain routing devices in the network implement uniform sampling or an approximation of it. Alternatively, a network may implement heterogeneous sampling algorithms, each optimized for certain kinds of traffic sub-populations. For instance, some routing devices can implement sophisticated algorithms to give accurate flow-size estimates of medium-sized flows that otherwise would not have been captured by uniform sampling. A network can have different active and passive measurement infrastructure and algorithms deployed, and some paths through the network may have greater measurement potential than others.

SUMMARY

The present invention relates generally to monitoring transit traffic at one or more points in a network, and in particular but not exclusively, to an apparatus, method, system, and manufacture for routing traffic sub-populations over fixed monitoring locations.

In an embodiment, the present invention provides a method for routing-assisted traffic monitoring including providing a set of flows for a network, each flow having an associated ingress routing device and an associated egress routing device; determining, by a controller, a micro-flowset routing for the set of flows, the micro-flowset routing defining which of a set of directed links connecting a plurality of routing devices are used to route each of the flows from the respective ingress routing device to the respective egress routing device; transmitting, by the controller, flow information to at least a first routing device of the plurality of routing devices according to the micro-flowset routing, the flow information defining which of the set of directed links are to be used to route at least one flow entering the first routing device to a second routing device of the plurality of routing devices, wherein the micro-flowset routing is constrained such that a traffic engineering policy of the network is not violated.

BRIEF DESCRIPTION OF THE DRAWING(S)

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on".

Any method for monitoring network traffic must typically work within the constraints of an existing intra-domain traffic engineering (TE) policy that is geared for efficiently utilizing bandwidth resources, or meeting Quality of Service (QoS) constraints, or both. TE policy is usually defined for aggregated flows. On the other hand, traffic measurement usually deals with a finer level of granularity. For instance, a flow is typically based upon the five tuple <Source IP, Destination IP, Source port, Destination port, protocol> for measurement purposes. Common intra-domain protocols (IGPs) like Open Shortest Path First (OSPF) and Intermediate system to intermediate system (IS-IS) use link weights to specify the placement of traffic for each Origin-Destination (OD) pair (possibly consisting of millions of flows). The TE policy generally does not concern itself with how constituent flows of an OD pair are routed as long as the aggregate placement is preserved.

The Open Flow Switch Specification version 1.0.0, published on Dec. 31, 2009 by the OpenFlow Switch Consortium, describes an open protocol that can be used to program the flow-table in a routing device. An OpenFlow routing device includes a flow-table with an action associated with each flow entry to instruct the routing device how to process flow, and a Secure Channel connecting the routing device to a controller. Commands and packets can be sent between the controller and a routing device using the OpenFlow Protocol. The OpenFlow Protocol provides an open and standard way for a controller to communicate with a routing device. Through the use of the OpenFlow protocol, a controller can control the routing of traffic flow through a network.

An embodiment of the present invention provides a method and apparatus for routing-assisted traffic monitoring that includes providing a set of flows, each flow having an associated ingress routing device and an associated egress routing device. A controller determines a micro-flowset routing for the set of flows, the micro-flowset routing defining which of a set of directed links connecting a plurality of routing devices are used to route each of the flows from the respective ingress routing device to the respective egress routing device. The controller transmits flow information to at least a first routing device of the plurality of routing devices according to the micro-flowset routing, the flow information defining which of the set of directed links are to be used to route at least one flow entering the first routing device to a second routing device of the plurality of routing devices.

Illustrative Operating Environment

Figure 1:
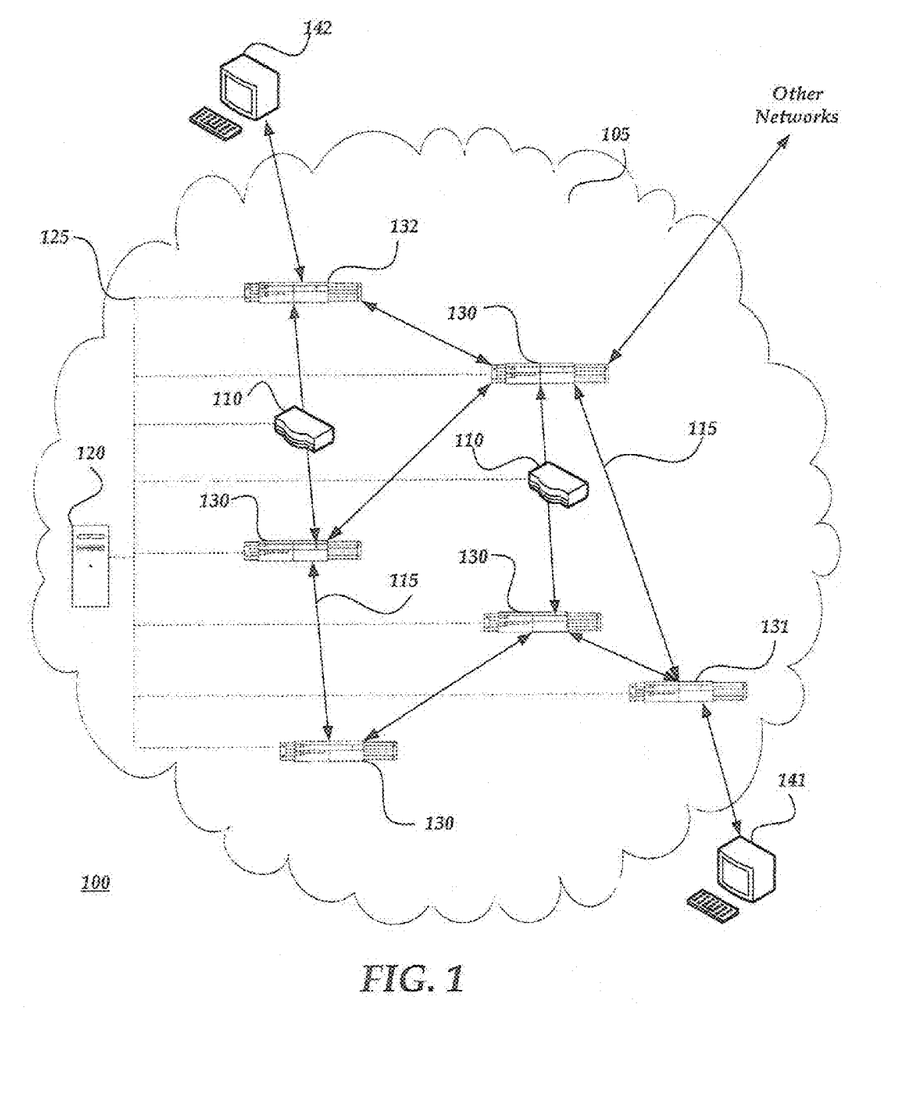
FIG. 1 is a block diagram of an illustrative operating environment for practicing the invention.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes client devices 141, 142 and Network 105. Network 105 includes routing devices 130, 131, 132, dedicated monitoring devices 110, and controller 120.

Client devices 141, 142 may include virtually any computing device that typically communicate using a wired or wireless communication medium such as personal computers, multiprocessor systems, microprocessor-based or programmable consumer electronics, network PCs, or the like. Generally, client devices 141, 142 may also include virtually any mobile computing device capable of receiving and sending communications over a network, such as a wired network, wireless network, or the like. Such devices include portable devices such as, cellular telephones, smart phones, pagers, radio frequency (RF) devices, infrared (IR) devices, Personal Digital Assistants (PDAs), handheld computers, laptop computers, wearable computers, tablet computers, integrated devices combining one or more of the preceding devices, or the like.

Client devices 141, 142 are connected to one another via a network of routing devices 130. Although FIG. 1 illustrates only two client devices, system 100 generally will include many client devices. Data enters network 105 from client device 141 via ingress routing device 131. Similarly, information exits network 105 via egress routing device 132. It should be understood that routing device 131 and routing device 132 can each act as either an ingress routing device or an egress routing device depending on the direction of the flow of information.

Network 105 connects the client devices 141, 142 to one another. Network 105 is enabled to employ any form of computer readable media for communicating information from one electronic device to another. Network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, routing devices 130 act to communicate information between LANs, enabling messages to be sent from one to another. Furthermore, remote computers and other related electronic devices could be remotely connected to either LANs or WANs via a modem and temporary telephone link. In essence, network 105 includes any communication method by which information may travel between computing devices. Network 105 may also be connected to other networks not included in system 100.

Routing devices 130 are electronic devices that forward data between computer networks, e.g., LANs and WANs. Routing devices 130 may include devices that operate at the IP internetwork layer or OSI layer 3. Alternatively, routing devices 130 may operate at the data link layer or OSI layer 2. Thus, routing devices 130 may include gateways, routers, network switches, network bridges, or the like.

Routing devices 130 communicate with one another and client devices via network links 115. Network links 115 may include twisted wire pair or coaxial cable, analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Multiple network links 115 of varying types may be used to connect a pair of routing devices 130.

Each routing device 130 may include network monitoring equipment that enables the routing device to monitor the network traffic on one of the network links 115. For example, DAG® cards may be used to monitor network traffic on a given link. Additionally, network 105 may include dedicated monitoring devices 110 connected to one or more network links that monitor network traffic on the network links to which dedicated monitoring devices 110 are connected.

Network monitoring equipment (both within a routing device and standalone) may capture all network traffic traversing a given network link for analysis. Alternatively, the network monitoring equipment may capture only a subset of the data traversing the network link. The type of data to be captured may be specified by a network operator. The monitoring equipment may, in addition or alternatively, collect statistical data with respect to network traffic that traverses the network link.

A controller 120 is connected to the routing devices via control link 125. Control link 125 may include a physical connection between the controller 120 and each of the routing devices 130. Alternatively, control link 125 may be a logical connection, i.e., controller 125 may use the other network links 125 to communicate with the routing devices. Controller 125 communicates with each of the routing devices 130 to program each of the routing devices 130 with respect to how each routing device routes network traffic. For example, each routing device 130 may contain a flow-table that defines how flows will be routed. Controller 125 may use the OpenFlow protocol to program the flow-table in each routing device 130. However, other methods for programming routing devices 130 by transmitting flow information to the routing devices 130 may be used.

Controller 125 may also be connected to any network monitoring equipment included in the routing devices 130 and the dedicated monitoring devices 110. Controller 125 may collect measurement data from the monitoring equipment. Alternatively, other network entities, e.g., servers or the like may be employed to collect and process measurement data.

Illustrative Controller

Figure 2:
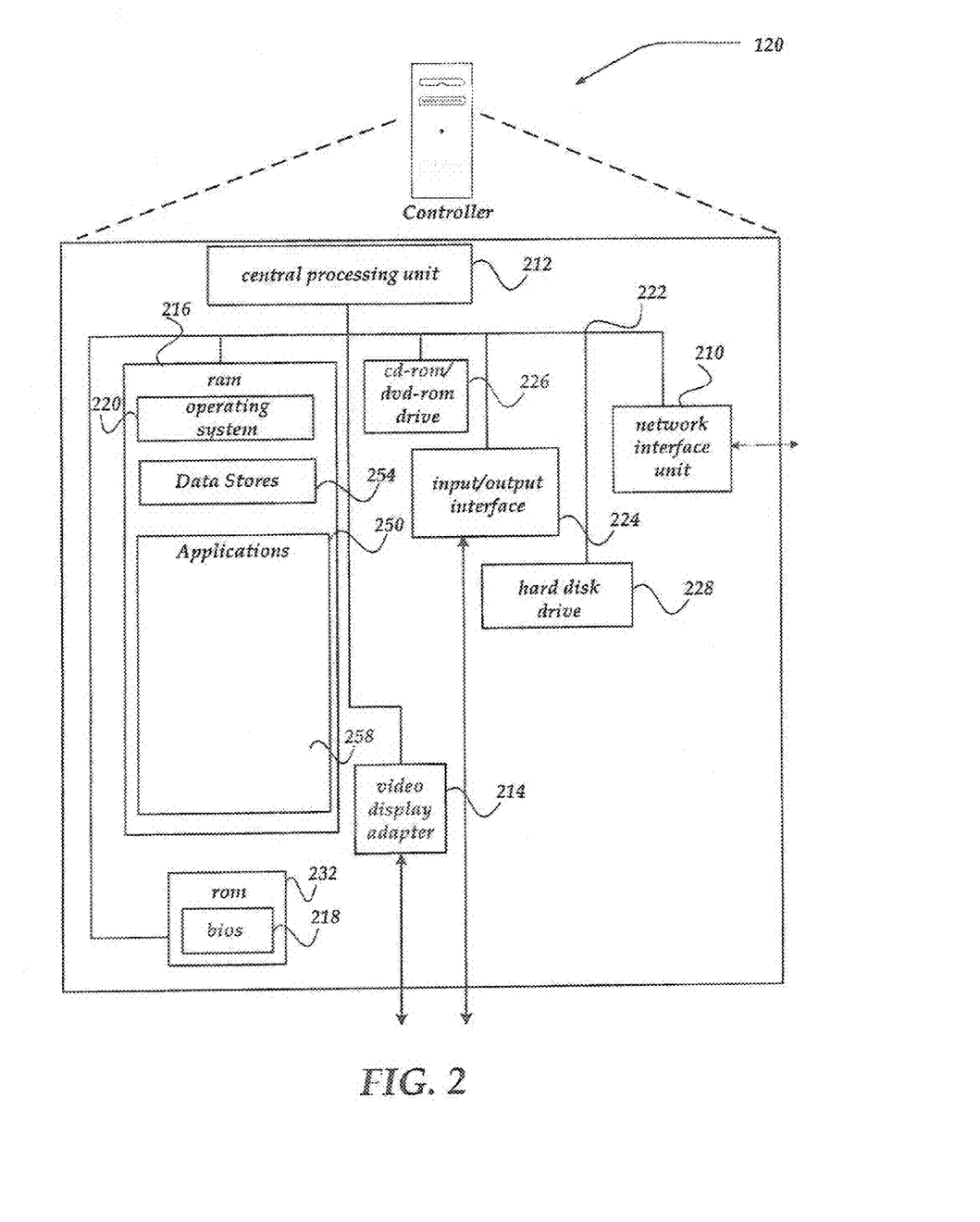
FIG. 2 is a block diagram of a controller according to an embodiment of the invention.

FIG. 2 shows one embodiment of controller 120. Controller 120 may include many more components than those shown. The components shown, however, are sufficient to disclose an illustrative embodiment for practicing the invention.

Controller 120 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of Controller 120. Any general-purpose operating system may be employed. Basic input/output system ("BIOS") 218 is also provided for controlling the low-level operation of Controller 120. As illustrated in FIG. 2, Controller 120 can communicate with the routing devices 130, 131, 132 and other network devices using a communications network, via network interface unit 210, which is constructed for use with various communication protocols including the TCP/IP protocol. Network interface unit 210 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

RAM 216 may include one or more data stores, which can be utilized by Controller 120 to store, among other things, applications 250 and/or other data. RAM 216 can also be used to store database information.

The mass memory also stores program code and data. One or more applications 250 are loaded into mass memory and run on operating system 220. Examples of application programs include network monitoring and routing control programs.

The invention may also be practiced in distributed computing environments where tasks associated with the controller 120 are performed by multiple remote processing devices that are linked through a communications network.

Illustrated Routing Device

Figure 3:
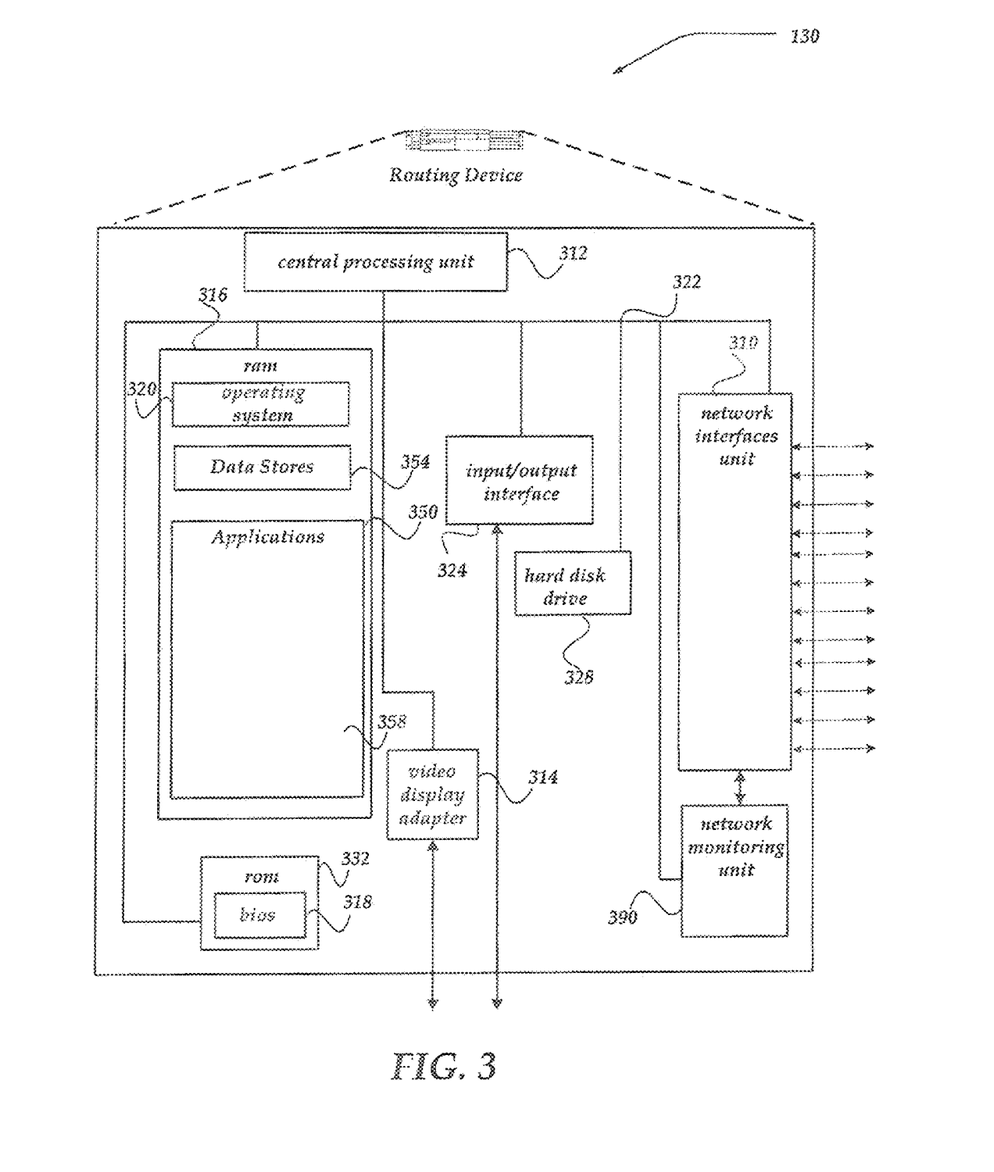
FIG. 3 is a block diagram of a routing device according to an embodiment of the invention.

FIG. 3 shows one embodiment of a routing device 130, according to an embodiment of the invention. Routing device 130 may include many more components than those shown. The components shown, however, are sufficient to disclose an illustrative embodiment for practicing the invention.

Routing device 130 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of routing device 130. Any general-purpose operating system may be employed. Basic input/output system ("BIOS") 318 is also provided for controlling the low-level operation of Routing device 130. As illustrated in FIG. 3, Routing device 130 can also communicate with the Internet, or some other communications network, via network interfaces unit 310, which is constructed for use with various communication protocols including the TCP/IP protocol. Network interfaces unit 310 typically contains multiple interfaces to connect to multiple network links. Network interfaces unit 310 may also be used to connect to controller 120 via a dedicated port. Alternatively, a separate dedicated port may be included for connection to the controller 120.

A network monitoring unit 390 may also be included in Routing device 130. The network monitoring unit can be used to capture network traffic associated with the network interfaces. Captured traffic data may be stored in mass memory. Network monitoring unit 390 may also perform statistical or other analysis on the captured network traffic.

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

RAM 316 may include one or more data stores, which can be utilized by Routing device 130 to store, among other things, applications 350 and/or other data. RAM 316 can also be used to store database information.

The mass memory also stores program code and data. One or more applications 350 are loaded into mass memory and run on operating system 320. Examples of application programs may include network routing, network monitoring, and network protocol implementations, among others. The mass memory may include a flow-table, with an action associated with flow entries in the flow-table. The flow table defines how the routing device will process different flows. Data can be entered into the flow table by the controller 120 via the control link 125.

Illustrative Process for Routing Network Traffic

In an embodiment, the present invention provides a system and method for routing-assisted traffic monitoring in the context of a centralized architecture. A centralized architecture refers to the case where the controller 120 that determines how distributed routing devices 130 will route packets has information with respect to a) the TE policy; b) the topology and monitoring infrastructure deployment; and c) the size and importance of traffic sub-populations.

As noted above, TE policy is concerned with aggregated flows, whereas traffic measurement usually deals with a finer level of granularity. While common IGPs may use link weights to specify the placement of traffic for each OD pair, the TE policy is generally unconcerned with how constituent flows of an OD pair are routed as long as the aggregate placement is preserved. Thus, again, certain traffic sub-populations may distinguishable from a measurement perspective while remaining indistinguishable from a TE perspective.

Figure 4A:
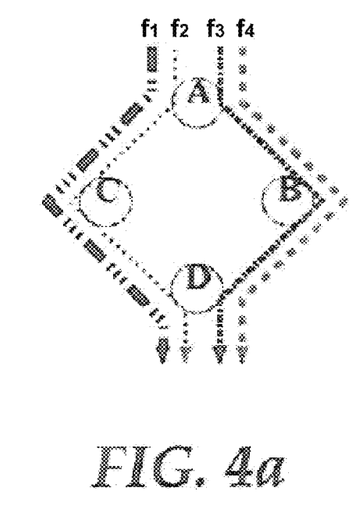
FIG. 4 illustrates exemplary routings of four flows in an exemplary network.
Figure 4B:
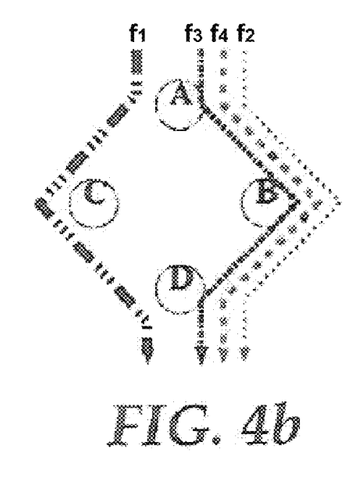
Figure 4C:
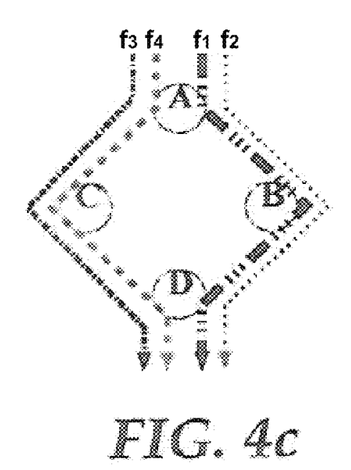

As a result, as illustrated in FIGS. 4a, 4b, and 4c, fine-grained measurement traffic sub-populations can be routed without disrupting the aggregate routing. FIGS. 4a, 4b, and 4c show four traffic subpopulations (f1, f2, f3, f4) that have the same ingress and egress routing devices. Assume for example that (a) f1, f2, f3, and f4 are of equal size, (b) routing device B has some dedicated monitoring equipment, (c) it is an object for a network operator to monitor f2, and (4) the TE policy is to minimize the maximum link utilization. FIG. 4a depicts the original routing that obeys the TE policy. FIG. 4b represents a routing that violates the TE policy in order to route f2 through routing device B. However, if the traffic sub-populations are routed as in FIG. 4c, f2 is allowed to pass through the dedicated monitoring equipment, and the routing is indistinguishable from the original from the perspective of the TE policy. It should be noted that the aggregate traffic must span multiple paths in order for routing-assisted traffic monitoring to be useful in this way. In other words, if the aggregate traffic traverses only a single path, then no opportunity exists to differentially route subsets of the traffic.

Because TE objectives may ignore the exact placement of aggregate traffic and only take cognizance of summary metrics such as the maximum link utilization across the network, an aggregate routing that is slightly different from the original routing may still yield the same value of the summary metric. For example, suppose f2 and f3 pertain to two different OD pairs in FIG. 4a. Then the new routing depicted by FIG. 4c changes the aggregate traffic placement discussed above. However, from a TE perspective the total link utilization of all links remains the same.

Additionally, a network operator can specify a certain permissible level of TE policy violations. Thus, a tradeoff is enabled between the advantage, with respect to monitoring objectives, derived from rerouting the network traffic, and adherence to TE policy. For example, if the network operator is willing to allow a 33% increase in the maximum link utilization, the routing in FIG. 4b becomes a compliant solution.

Routing-assisted traffic monitoring can be employed to increase the quality of traces captured for subsequent Deep Packet Inspection (DPI), which allows after-the-fact analysis of events seen in the network and the payload properties of transiting Internet traffic. However, capturing payload is often an expensive process that require dedicated hardware (e.g., DPI with TCAMs), or specialized algorithms that are susceptible to errors (e.g., DPI with Bloom Filters), or vast storage capacity for captured traces. As a result, operators deploy DPI agents sparsely at strategic locations of the network, with limited storage resources. In such cases, a payload of only a subset of network traffic is captured by the dedicated hardware.

Thus, improving the quality of the capture traces for subsequent DPI involves allocating the limited monitoring resources such that the representation of more interesting traffic is increased. Routing-assisted traffic monitoring can be used to increase the quality of the traces captured by routing interesting traffic across routes where it has a greater probability of being captured.

The system described herein can improve not just quality of trace capture for DPI, but also intrusion detection boxes, and new packet capture methodologies (e.g., NetVR from UCSD).

Framework for Routing-Assisted Traffic Monitoring

In an embodiment, the present invention provides a framework for routing-assisted traffic monitoring in the context of a centralized architecture. G (V, E) represents network 105, where V is the set of routing devices 130 and E is the set of directed links. Each of the directed links represents a unidirectional network connection between a pair of routing devices 130. A macro-flowset represents a set of flows for which an aggregate routing placement is given. In the context of intra-domain IP routing, a macro-flowset comprises all flows between an Origin-Destination (OD) pair. For MPLS networks, macro-flowsets can be defined as all flows between an ingress-egress pair in the same QoS class. Flows in a macro-flowset have the same ingress and egress routing devices 130. A single macro-flowset is defined as all flows between an OD pair. The set of all $|V| \times (|V|-1)$ macro-flowsets is given by $\Theta$ $\Gamma_{i,j}^x$ gives the fraction ([0, 1]) of the traffic demand belonging to macro-flowset x placed along link (i, j). $\{\Gamma\}_{(i,j) \in E}^{x \in \Theta}$ is an input to the traffic routing problem and represents an original routing. It is assumed $\{\Gamma\}_{(i,j) \in E}^{x \in \Theta}$ is a valid routing, i.e. flow conversation constraints are not violated and it is compliant with network TE policy.

A macro-flowset may consist of multiple micro-flowsets. $\theta$ denotes the set of micro-flowsets. There is a many-to-one relationship between micro-flowsets and macro-flowsets. $\gamma_x$ represents the set of micro-flowsets that belong to the macro-flowset x. The fraction of traffic demand belonging to micro-flowset y, placed along link (i,j) is represented by $\gamma_{ij}^y$ $\{\gamma\}_{(i,j) \in E}^{y \in \theta}$, represents the micro-flowset routing and gives the decision variables of the traffic routing problem. The ingress and egress routing devices 131, 132 of micro/macro-flowset are denoted as $in_z$ and $out_z$ respectively. $\{\Phi\}_{x \in \Theta}$ and $\{\phi\}_{x \in \Theta}$ represent the traffic demands or sizes of the macro-flowsets and micro-flowsets, respectively. It follows that $\Phi_x = \Sigma_{y \in \gamma_x} \phi_y$.

Each flow $f \in \mathcal{F}$ is assigned to a micro-flowset. All flows belonging to the same micro-flowset have the same routing. The number of micro-flowsets per macro-flowset (k) can have significant implications on the performance of routing-assisted traffic monitoring. The greatest degree of freedom exists if each flow is assigned to a unique micro-flowset. However, this may be impractical from both a computational and implementation perspective because a larger k value increases the complexity of routing-assisted traffic monitoring.

For example, routing devices 130 may have to keep separate forwarding state information for each of the k micro-flowsets per macro-flowset. Therefore, a tradeoff exists between the performance gain and scalability of routing-assisted traffic monitoring. To reduce the required computational resources, each of the M flows in F belonging to a particular macro-flowset may be assigned to one of its corresponding k micro-flowsets, where M>k. There can be multiple ways of making such an assignment. For example, an equal number of flows may be assigned to each of the k micro-flowsets of a macro-flowset, while ensuring that the sampling importance of each flow in micro-flowset i is greater than the sampling importance of each flow in the micro-flowset i+1.

The measurement infrastructure and measurement requirements may be defined as follows. $\{S\}_{(i,j) \in E}$ denotes the sampling characteristic of all directed links. The sampling characteristic is the ability of a link to sample traffic. For example, the sampling characteristic may be a simple metric such as the link sampling rate. $\{I\}_{y\in\theta}$ denotes the sampling utility of the micro-flowsets, which is a generic metric that defines the importance of measuring a micro-flowset. $\{S\}_{(i,j)\in E}$ and $\{I\}_{y\in\theta}$ are inputs to the traffic routing problem.

A sampling resolution function β can be defined as:

$$\beta:(\{\gamma\}_{(i,j)\in E}^{y\in\theta},\{S\}_{(i,j)\in E},\{I\}_{y\in\theta})\rightarrow \Re \quad (1)$$

where β assigns a real number representing the monitoring effectiveness of a micro-flowset routing for given link sampling characteristics and micro-flowset sampling utilities. Routing-assisted traffic monitoring may be achieved by maximizing β subject to certain routing constraints. Specifying β, $\{S\}_{(i,j)\in E}$, $\{I\}_{y\in\theta}$, and the routing constraints define the concrete routing-assisted traffic monitoring application.

Routing-assisted traffic monitoring may be achieved by maximizing β subject to the defined routing constraints. To maximize β, the constituents i.e., the link sampling characteristics ($\{S\}_{(i,j)\in E}$) and micro-flowset sampling utilities ($\{I\}_{y\in\theta}$) of the sampling resolution function (β) may be defined. The routing constraints, including the network TE metric and the number of micro-slow, may also be defined.

The routers could also be running other schemes, such as streaming, ProgME or FlexSample type modules. The monitoring effectiveness would be different in these cases. The sampling characteristic of a link i.j ..., $S_{(i,j)}$ may be defined in different ways. For example, a routing device 130 connected to link (i.j.) may include monitoring equipment that is capable of sampling some or all of the network traffic that traverses link (i.j.). In such a case, $S_{(i,j)}$ may be equal to $p_{ij}\in[0,1]$, where $p_{ij}$ represents the known sampling rate of the monitoring equipment connected to link (i.j.). Alternatively, the sampling characteristic may be defined based on the total amount of data that can be captured on the link.

The micro-flowset sampling utilities ($\{I\}_{y\in\theta}$) define what constitutes traffic of interest. Routing-assisted traffic monitoring performs best when the diversity associated with the micro-flowset sampling utilities is maximized. The greater the diversity, the larger the benefit of using routing-assisted traffic monitoring to make disaggregated micro-flowset routing decisions. On the other hand, if all micro-flowsets have the same sampling importance then the ability to make disaggregated routing decisions is of little use.

To determine the utility of each flow, a field of interest is defined as a subset of the bits of a packet's IP header in an embodiment of the invention. This could be any subset. For example, without loss of generality, a field representing the destination port may be used as the field of interest. In this case, u(i) is defined as the utility of capturing a packet with a specific destination port i. In one embodiment, u(i) may be inferred using historical data. If the probability mass functions P and Q that represent the distribution of destination ports in the recent traffic history and the long term traffic history, respectively are known, utilities can be assigned such that more packets are captured for flows that are responsible for the difference between P and Q. The quantity u(i) may be computed as follows:

$$u(i)=-\ln(1-|P(i)-Q(i)|) \quad (2)$$

According to Eq. 2, the utility of capturing a packet with the destination port equal to I increases with the absolute difference between P(i) and Q(i). When Q(i) is equal to P(i), u(i) is equal to zero.

Network operators may define their own utility functions depending upon their measurement objectives. For example, the utility of a flow may depend on the number of anomalous packets captured, or in more general terms the number of unique packets sampled, weighted by the importance of the flow. The utility of a flow may also depend on the resources, e.g. the amount of memory, required to track the flow.

Routing Constraints

When network traffic is re-routed, this is preferably executed so as to conform to predetermined routing constraints. For example, the routing constraints may specify that the TE policy of the network 105 should not be violated. A number of exemplary routing constraints are described below.

Least Disruption Routing (LTD)

A first embodiment of routing constraints, referred to as LTD, can be formulated as follows:

maximize β
subject to $$\sum_{j:\,(i,j)\in E}\gamma_{ij}^{y}-\sum_{j:\,(j,k)\in E}\gamma_{jk}^{y}=0 \quad y\in\theta,\,j\neq in_y,\,out_y \quad (3)$$

$$\sum_{j:\,(i,j)\in E}\gamma_{ij}^{y}-\sum_{j:\,(j,k)\in E}\gamma_{jk}^{y}=-1 \quad y\in\theta,\,j=in_y \quad (4)$$

$$(1+\varepsilon)\sigma^{\Gamma}\geq\sigma^{\gamma} \quad (5)$$

$$\gamma_{ij}^{y}\geq 0 \quad y\in\theta,\,(i,j)\in E \quad (6)$$

According the LTD embodiment, β can be maximized by computing a micro-flowset) routing, $\{\gamma\}_{(i,j)\in E}^{y\in\theta}$, that obeys the flow conservation constraints given by Eqs. 3 and 4. The only significant constraint for LTD is that the aggregate TE policy is not violated. This constraint can be represented by Equation 5. $\sigma^{\Gamma}$ gives the value of the TE metric of the original macro-flowset routing. Similarly $\sigma^{\gamma}$ can be a function of the micro-flowset routing that gives the corresponding value of the TE metric for it. Equation 5 specifies that $\sigma^{\Gamma}$ not exceed $\sigma^{\gamma}$ by more than a certain percentage, signified by tolerance parameter ε. Allowing the TE constraints to be violated, i.e., setting ε>0 will increase the performance gain of the system. Equation 6 states that $\gamma_{i,j}^{y}$ is not negative.

For the new routing $\{\gamma\}_{(i,j)\in E}^{y\in\theta}$ to obey the routing constraints, the TE metric used by the network 105 should be known. The TE metric is generally a measure of the utilization of network links. For example, $\sigma^{\Gamma}$ and $\sigma^{\gamma}$ can represent |E| element row vectors giving link utilizations for each link. Alternatively, $\sigma^{\Gamma}$ and $\sigma^{\gamma}$, can each be a single non-negative numbers representing the utilization of the most congested link. The definition of the TE metric depends upon the network's TE policy.

No Routing Loops Routing (NRL)

The flow conservation constraints in LTD do not guarantee the absence of loops. As can be seen from FIGS. 4a, 4b and 4c, it is possible that the optimal solution of LTD may involve repeatedly sending traffic between routers A, B and C in a loop, so as to sample the traffic more frequently while still obeying the flow conservation and TE constraints. Such routing loops may not be feasible or desirable in real-world routing implementations. A second embodiment, denoted as No Routing Loops Routing (NRL) ensures that the micro-flowset routing is loop-free. Loops are avoided by restricting the set of links along which a micro-flowset can be routed. This restriction is accomplished by supplementing the LTD embodiment with the following additional constraint:

$$\gamma_{ij}^{y}=0\,y\in\theta,(i,j)\notin\Psi_{x:y\in\gamma_X} \quad (7)$$

Eq. 7 states that only links included in $\Psi_{x:y\in\gamma_X}$ may be used for routing micro-flowset y∈θ. The membership of $\Psi_{x:y\in\gamma_X}$ can be restricted such that the induced graph of $\Psi_{x:y\in\gamma_{X}}$ forms a directed acyclic graph. Since there are no cycles in the graph induced by $\Psi_{x:y\in\gamma_{X}}$, the micro-flowset routing does not contain any loops. A feasible routing can exist for each micro-flowset by stipulating that the following implication is always true:

$$\Gamma_{ij}^{x:y\in\gamma_{X}>0} \Rightarrow (i,j)\in\Psi_{x:y\in\gamma_{X}} \quad (8)$$

There are multiple ways of constructing $\Psi_x$. An example construction is given in Algorithm I, i.e. LINK-SELECT, below.

---
ALGORITHM 1-LINK-SELECT
---
procedure LINK-SELECT (G(V, E), x, Γ)
  $\Psi_x = 0$
  FORALL (i, j) ∈ E
    IF $\Gamma_{ij}^x > 0$
      $\Psi_x \leftarrow \Psi_x \cup \{(i, j)\}$
    ENDIF
  ENDFOR
  $\hat{E} \leftarrow E/\Psi_x$
  {sort $\hat{E}$ such that a specific order of choosing links may be specified for the following part}
  FORALL (i, j) ∈ $\hat{E}$
    IF Induced graph of $\Psi_x \cup \{(i, j)\}$ is acyclic
      $\Psi_x \leftarrow \Psi_x \cup \{(i, j)\}$
    ENDIF
  ENDFOR
  return $\Psi_x$
end procedure
---

According to algorithm 1, all links that were used in the original routing for macro-flowset χ can be included in $\Psi_x$. This set of links forms a directed acyclic graph because the original routing is assumed to be loop-free. The remaining links can then be enumerated one by one and added to $\Psi_x$, if doing so would not introduce any cycles in the graph induced by the directed links in $\Psi_x$. The remaining links may first be sorted based on the sampling characteristic $S_{(i,j)}$ of the links. For example, links having a higher sampling characteristic $S_{(i,j)}$ may be given preference over other links.

Figure 5:
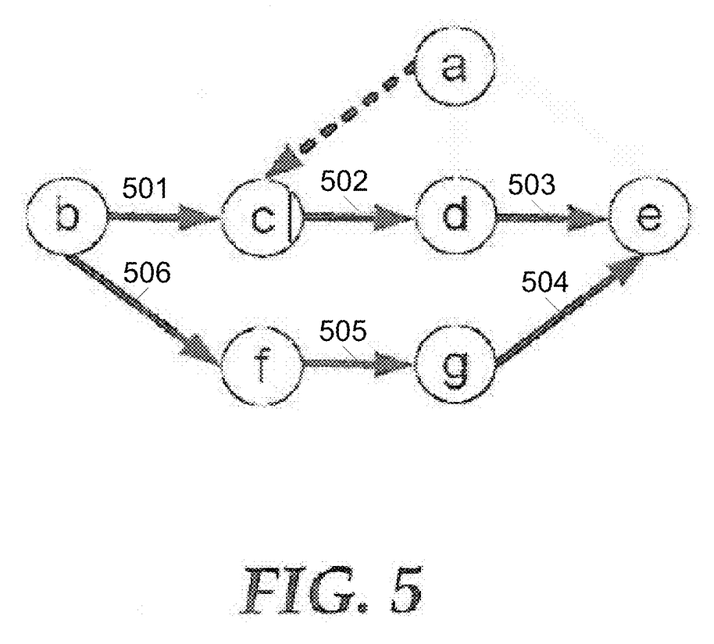
FIG. 5 illustrates a dangling links problem associated with routing traffic flows.

Ideally, the directed acyclic graph induced by $\Psi_x$ can have a large number of unique paths from $in_x$ to $out_x$. This would result in greater flexibility for routing the micro-flowsets. However, adding links may not be commensurate with adding paths because of the dangling links problem illustrated in FIG. 5. The bold links 501-506 in FIG. 5 are links that are used in Ψ the original routing for a macro-flowset ($in_x$=b and $out_x$=e) and are, therefore, automatically included in $\Psi_x$.

If link 501 (a, c) is next considered in the algorithm, the addition of link (a,c) 501 to $\Psi_x$, would not induce a cycle. If link 501 (a,c) is added, the addition of link 501 (a, c) precludes link (d, a) from being added to $\Psi_x$ because doing so would result in a directed graph including the cycle (a, c, d, a). The addition of link 501 (a, c) is of no value because link 501 (a,c) is not along any path from $in_x$ to $out_x$. In contrast, had links (d, a) and (a, e) been selected instead, additional paths would have been successfully introduced.

Algorithm 2 is an alternative to algorithm 1 that works by selecting links one by one, from the one with least sampling rate to the highest sampling rate. For each selected link, the link can first be precluded, the shortest path connecting source and destination can then be calculated. If the new shortest path has a larger sampling rate and if the new path combined with the original path does not introduce a loop, then the new link is added to the candidate links.

Algorithm 2 deals with a situation where one link may have a small sampling rate. A new link that can also be used but has a better sampling rate can be found. The new link is likely to be longer. However, the new link may still be the shortest of the remaining links and be better than the precluded link. Algorithm 2 prevents the addition of links that might not connect the source and the destination at all.

---
ALGORITHM 2-IMPROVED LINK-SELECT
---
procedure LINK-SELECT (G(V, E), x, Γ)
  $\Psi_x = 0$
  FORALL (i, j) ∈ E
    IF $\Gamma_{ij}^x > 0$
      $\Psi_x \leftarrow \Psi_x \cup \{(i, j)\}$
    ENDIF
  ENDFOR
  Order ($F_i$) {Order in increasing order of measurement capability}
  FORALL (i, j) ∈ E
    $\hat{G} \leftarrow G/(i, j)$
    P ← Shortest Path on $\hat{G}$ {return the shortest path}
    If P ∪ E is acyclic AND P has better measurement quality than
      E ← E ∪ P
    End if
  ENDFOR
  $\Psi_x \leftarrow \Psi_x \cup E$
  return $\Psi_x$
end procedure
---

Algorithm 2 may be used in conjunction with algorithm 1. For example, if after running Algorithm 1, the additional links do not connect a particular OD pair, algorithm 2 may be run for that pair.

A third example construction of $\Psi_x$, which reduces the dangling links problem, is given in Algorithm 3, i.e. PATH-SELECT, below. Algorithm 3 is a heuristic that attempts to maximize the number of directed paths between ingress and egress routing devices.

---
ALGORITHM 3-PATH-SELECT
---
procedure PATH-SELECT (G(V, E), s, d)
  $\Psi_x = \emptyset$
  IF|V| = 1
    return $\Psi_x$
  ENDIF
  {Set all link capacities to 1}
  {Compute the Max-Flow (s, d)}
  FORALL (i, j) ∈ E
    IF f (i, j) > 0
      $\Psi_x \leftarrow \Psi_x \cup \{(i, j)\}$
    ENDIF
  ENDFOR
  {Compute M = Min-Cut (s, d)}
  {Partition G (V, E) into two sub-graphs $G_l$ ($V_l$, $E_l$) and $G_r$ ($V_r$, $E_r$) by removing the links in M}
  {Collapse all nodes u ∈ $V_l$ such ∃v: (u, v) ∈ M to a node $d_l$}
  {Collapse all nodes v ∈ $V_r$ such ∃u: (u, v) ∈ M to a node $s_r$}
  $\Psi_l$ = PATH-SELECT ($G_l$($V_l$, $E_l$), s, $d_l$)
  $\Psi_r$ = PATH-SELECT ($G_r$($V_r$, $E_r$), $s_r$, d)
  $\Psi_x = \Psi_x \cup \Psi_l \cup \Psi_r$
  return $\Psi_x$
end procedure
---

In algorithm 3, f (i. j) denotes the flow of link (i. j). Algorithm 3 is a recursive procedure that employs the max-flow min-cut theorem to produce $\Psi_x$, having an induced graph that is acyclic. The max-flow min-cut theorem states that the maximum amount of flow passing from a source to a sink is equal to the minimum capacity that needs to be removed from the network so that no flow can pass from the source to the sink.

Relaxed Sticky Routes Routing (RSR)

Figure 6A:
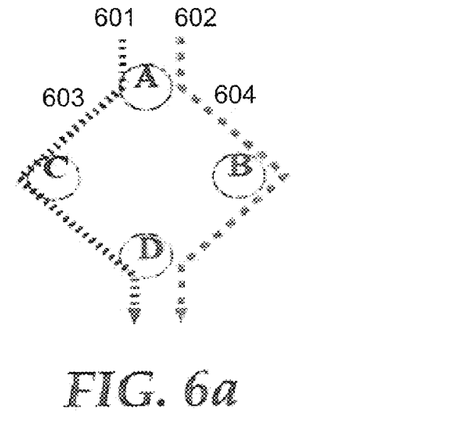
FIG. 6 illustrates exemplary routings of two flows in an exemplary network.
Figure 6B:
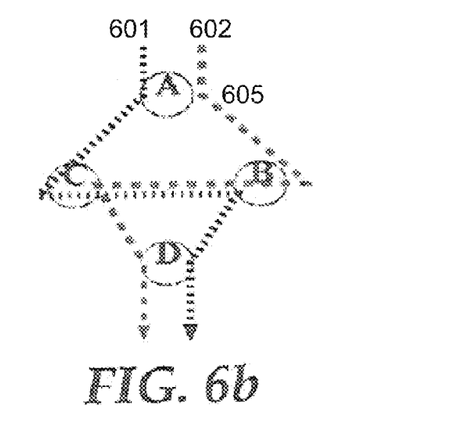

NRL ensures that there are no routing loops. Depending upon the exact forwarding mechanisms and routing protocol, however, NRL may still not be feasible. For example, FIGS. 6a and 6b illustrate two macro-flowsets $x_1$ (601) and $x_2$ (602)

that may have the same traffic demands i.e., $\Phi_{x1}=\Phi_{x2}$. FIG. 6a represents an original routing that may send all traffic belonging to $x_1$ along the path 603 (A, C, D). Traffic belonging to $x_2$ may be sent along 604 (A, B, D). According to NRL, $\{\gamma\}_{(i,j)\in E}^{y\in\theta}$, can be set such that the micro-flowsets in macro-flowset $x_1$ ($\gamma_{x_1}$) are routed across the path (A, C, B, D), and the micro-flowsets in macro-flowset, $x_2$ ($\gamma_{x_2}$) are routed across the path 605 (A, B, C, D). The utilization on all links may remain the same except for (B, C) and (C, B). Assuming that the TE policy does not constrain the load on links (B, C) and (C, B), the micro-flowset routing is a feasible solution for both LTD and NRL. However, this routing solution may not be feasible in practice given the routing implementation. For example, the destination based shortest path routing paradigm followed in IP routing may not allow such a routing. The original routing implied that links (B, C) and (C, B) were not along the shortest path from A to D and B to D, respectively. The new routing would, therefore, require the micro-flowsets from A to D to be routed across a link that is not part of the shortest path from A to D. Such a new routing may not be achievable given the underlying routing mechanisms. RSR ensures that the micro-flowset routing does not route a macro-flowset's traffic along a link that the macro-flowset's traffic was not routed along in the original routing. This is accomplished by supplementing LTD with the following additional constraint (instead of using Eq. 6):

$$\gamma_{ij}^{y}=0 \, y\in\theta, \Gamma_{ij}^{x:y\in\gamma_x}=0 \quad (9)$$

Note that RSR is a special case of NRL with $\Psi_{x:y\in\gamma_X}$ constructed such that a link $(i, j)\in\Psi_{x:y\in\gamma_X}$ if and only if $\Gamma_{ij}^{x:y\in\gamma_x}>0$. This set of links forms a directed acyclic graph because the original routing is assumed to be loop-free.

Each of the three embodiments (LTD, NRL, RSR) represents a different degree of restriction. LTD is the most flexible but may result in routing loops or traffic between an OD pair traversing links that are not traversed in the original routing. NRL disallows loops but may result in routing semantics being violated. RSR ensures loop-free routing as well as adherence to routing semantics. Consequently, the best measurement gains can be expected for LTD, NRL, and RSR in that order.

It should be noted that in the described embodiments, it is assumed that traffic can be distributed in any proportion across the set of permissible links for the macro-flowset as long as TE metric is not violated. This may or may not be possible depending upon the underlying forwarding mechanism. If not, then this would impose further restrictions on the micro-flowset routing.

It should be appreciated that that the flow conservation constraints and the non-negativity negativity constraints are linear functions. If the TE metric function $\sigma^{\gamma}$ is linear then the TE constraint is also linear. Therefore, if the elements of the objective function ($\beta$) are also linear functions of the decision variables, LTD, NRL, and RSR become linear programming (LP) algorithms solvable in polynomial time.

Micro-Flowset Membership Constraints

A macro-flowset consists of multiple micro-flowsets. Each micro-flowset can be independently routed where the routing depends upon the importance of measuring its constituent flows and the networking infrastructure and TE policy. The greater the number of micro-flowsets the greater the routing flexibility that can be used to enhance monitoring performance. However, it will be appreciated that the number of micro-flowsets also adds to the amount of information that needs to be tracked by the controller 120 and the routing devices 130 as well as to the complexity of the routing problem.

In the above description, it is assumed that each microflowset $y\in\theta$ has a given size $I_y$ and sampling importance $\theta_y$. However, strictly speaking, it is unlikely that the number of traffic sub-populations of a macro-flowset of interest from a measurement perspective is the same as the number of micro-flowsets. Typically, the number of micro-flowsets will be smaller than the number of traffic sub-populations of interest. Accordingly, the traffic sub-populations can be divided into a given number of micro-flowsets. While a range of micro-flowset configurations are possible and usable, it will be appreciated that the choice of how micro-flowsets are defined can have some effect. For example, if micro-flowsets are constructed such that all micro-flowsets have equal sampling importance then they will be indistinguishable from a measurement perspective. Consequently, there is little benefit in using routing-assisted monitoring to differentially route these indistinguishable micro-flowsets.

Figure 7:
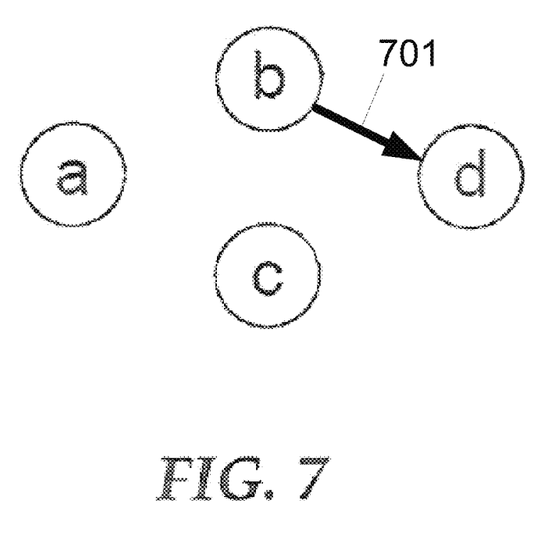
FIG. 7 is a block diagram of a network having monitoring equipment on only one link.

The significance of the micro-flowset composition can be more keenly appreciated from the following example. Consider a single macro-flowset x ($in_x$=a and $out_x$=d) in the network depicted in FIG. 7. All links in the network have capacity c. Further suppose that only link 701 (b, d) includes monitoring infrastructure that samples traffic at a 100% rate. Now suppose there are four traffic sub-populations of interest. Traffic sub-population 1 has a total amount of traffic equal to 1.25c, where c is the link capacity of the example network. Traffic sub-population 1 is also important from a measurement perspective having a sampling importance of 100. The other three sampling populations each have traffic equal to 0.25c and a sampling importance of 20. Table I shows two micro-flowset assignment schemes and associated routings, and the resulting performance. Note that the sampling importance of a micro-flowset is computed as the sum of the importance of its constituent traffic sub-populations weighted by the amount of traffic for that sub-population. Table I compares two cases. In one case sub-populations 1 and 2 are assigned to one micro-flowset, while sub-populations 2 and 3 are assigned to a different micro-flowset. In the other case sub-populations 2, 3 and 4 are lumped together in one micro-flowset while sub-population 1 is exclusively assigned to the other. It can be seen that the performance for the latter assignment scheme is better.

TABLE 1

| Assignment Scheme | Micro-Flowset ID (y) | Membership | Size | Importance (Weighted Sum) | Routing $\gamma^y_{ab}$ | $\gamma^y_{ac}$ | $\gamma^y_{*}$ | $\gamma^y_{cd}$ | Performance |
|---|---|---|---|---|---|---|---|---|---|
| I | A | {1,2} | 1.25c + 0.25c = 1.5c | 150 | 0.75 | 0.25 | 0.75 | 0.25 | 112.5 |
|  | B | {3,4} | 0.25c + 0.25c + 0.5c | 10 | 0 | 1 | 0 | 1 |  |
| II | A | {1} | 1.25c | 125 | 0.8 | 0.2 | 0.8 | 0.2 | 125.8 |
|  | B | {2,3,4} | 0.25c + 0.25c + 0.25c = 0.75c | 45 | 0 | 1 | 0 | 1 |  |

The routing constraints can be extended to control the micro-flowset composition. denotes the set of traffic-subpopulations for macro-flowset X∈θ. Each t∈T has a size $b_t$ and importance $i_t$. A new decision variable $X_t^y$ introduced that denotes the fraction of traffic belonging to t that is assigned to micro-flowset y. It should be noted that t may be fractionally assigned to multiple micro-flowsets.

maximize $\beta$
subject to $$\sum_{j:(i,j)\in E} \gamma^y_{ij} - \sum_{j:(j,k)\in E} \gamma^y_{jk} = 0 \quad y \in \theta, j \neq in_y, out_y \quad (10)$$

$$\sum_{j:(i,j)\in E} \gamma^y_{ij} - \sum_{j:(j,k)\in E} \gamma^y_{jk} = -1 \quad y \in \theta, j = in_y \quad (11)$$

$$(1+\varepsilon)\sigma^\Gamma \geq \sigma^\gamma \quad (12)$$

$$\gamma^y_{ij} \geq 0 \quad y \in \theta, (i,j) \in E \quad (13)$$

$$\sum_{y\in\theta} \chi^y_t = 1 \quad t \in \bigcup_{x\in\theta} T_x \quad (14)$$

$$\chi^y_t = 0 \quad t \in T_x, y \notin \Upsilon_x \quad (15)$$

$$\chi^y_t \geq 0 \quad t \in \bigcup_{x\in\theta} T_x \quad (16)$$

The given formulation defines the LTD Routing embodiment with the micro-flowset membership problem incorporated. Eq. 14 stipulates that t must be allocated completely amidst one or more micro-flowsets. Eq. 15 ensures that t can only be assigned to micro-flowset y if both t and y are associated with the same macro-flowset. The micro-flowset membership problem may be similarly incorporated into the NRL and RSR embodiments.

Application of Routing-Assisted Traffic Monitoring

Given a set of flows $\mathcal{F}$ each flow f∈ $\mathcal{F}$ has an associated ingress routing device $in_f \in V$ and egress routing device $out_f \in V$. f∈ $\mathcal{F}$ belongs to macro-flowset x if and only if $(in_f, out_f) = (in_x, out_x)$. The traffic demand of flow f is represented by $b_f$, and the importance of sampling the flow may be represented by $i_f$. k is defined to be the total number of micro-flowsets for each macro-flowset. No represents the set of flows that belong to the micro-flowset y. It follows that the aggregate traffic demand for macro-flowset x is given by $$\Phi_x = \Sigma_{f\in\mathfrak{I}_x} b_f$$

Most IP networks use link-state protocols such as OSPF and IS-IS for intra-domain routing. In such networks, every link is assigned a cost and traffic between any two routing devices is routed along minimum cost paths. Setting link weights is the primary tool used by network operators to control network load distribution and to accomplish TE objectives. For example, the local search meta-heuristic may be used to optimize link weights with respect to aggregate traffic demands $\{\Phi\}_{x\in\Theta}$. The optimized link weights may then be used to derive an original routing $\{\Gamma\}_{(i,j)\in E}^{x\in\Theta}$ It should be appreciated that alternative methods of deriving the original routing $\{\Gamma\}_{(i,j)\in E}^{y\in\Theta}$ are possible.

The importance of a flow f, $i_f$, can be considered to be equivalent to a number of points earned if a byte is sampled for that flow. Routing-assisted traffic monitoring attempts to maximize the total number of points earned, by routing the traffic across the given topology. This total number of points is given by the following:

$$\Delta_{MR} = \sum_{f\in\mathcal{F}} \sum_{(i,j)\in E} p_{ij} i_f b_f \gamma^{y^{-1}(f)}_{ij} \quad (17)$$

$V^{-1}(f)$ in Eq. 17 denotes the micro-flowset to which flow f belongs. In the default case, where routing-assisted traffic monitoring is not employed, all flows are routed according to the original routing $\{\Gamma\}_{(i,j)\in E}^{x\in\Theta}$. Hence, the total number of points for the default case is:

$$\Delta_{default} = \sum_{f\in\mathcal{F}} \sum_{(i,j)\in E} p_{ij} i_f b_f \Gamma^{y^{-1}(f)}_{ij} \quad (18)$$

$\gamma^{-1}$ (f) Eq. 18 denotes the macro-flowset to which flow f belongs. Therefore, the performance gain as a result of routing-assisted traffic monitoring is given by:

$$\Delta = \frac{\Delta_{MR} - \Delta_{default}}{\Delta_{default}} \quad (19)$$

An objective of routing-assisted traffic monitoring is to maximize Δ. The performance gain for a single flow f∈ $\mathcal{F}$ can also be found in an analogous manner given by Eq. 19.

$$\frac{\sum_{(i,j)\in E} p_{ij} i_f b_f (\gamma^{y^{-1}(f)}_{ij} - \Gamma^{y^{-1}(f)}_{ij})}{\sum_{(i,j)\in E} p_{ij} i_f b_f I^{y^{-1}(f)}_{ij}} \quad (20)$$

The routing-assisted traffic monitoring formulation requires that the sampling utility function is specified for each micro-flowset. Towards this end, the sampling utility function may be defined as $I_{y\in\Theta} = \Sigma_{f\in v_y} i_f b_f$. Therefore, the sampling utility of a micro-flowset is the sum of sampling utilities of its flows weighted by the flow sizes. The sampling resolution function (β) can then be defined as:

$$\beta = \sum_{y \in \theta} \sum_{(i,j) \in E} p_{ij} l_y \gamma_{ij}^y \quad (21)$$

$$= \sum_{y \in \theta} \sum_{(i,j) \in E} p_{ij} \gamma_{ij}^y \sum_{f \in v_y} i_f b_f$$

The controller 120 calculates a micro-flowset routings $\{\gamma\}_{(i,j) \in E}^{y \in \theta}$ that satisfies the routing constraints and maximizes β. For example, the controller 120 may calculate /3 for all of the possible micro-flowset routings $\{\gamma\}_{(i,j) \in E}^{y \in \theta}$ that satisfy the routing constraints and select the micro-flowset routing having the largest value for β. Alternatively, the controller 120 may employ an algorithm that requires that β be set to a predetermined minimum value. The controller 120 then instructs each of the routing devices 130 to implement the selected micro-flowset routing. The controller 120 may calculate a new micro-flowset routing each time a flow is added or removed from the network 105. Alternatively, the controller 120 may update the micro-flowset routing more or less often based on changes in the importance of certain flows or other factors.

The controller 120 may also receive measurement data from monitoring equipment connected to the network links. The controller 120 may alter the micro-flowset routing based on measurement results.

The specific embodiments discussed above are given by way of example only to describe one particular embodiment, and is not intended to be limiting. The above specification, examples, and data provide a complete description of the manufacture and use of the composition of the invention. Since many embodiments of the invention can be made without departing from the spirit and scope of the invention, the invention also resides in the claims hereinafter appended.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for routing-assisted traffic monitoring comprising:
   providing a macro-flowset representing a set of flows for a network, the macro-flowset having an associated ingress routing device and an associated egress routing device, and wherein the macro-flowset comprises a plurality of micro-flowsets, each micro-flowset comprising one or more flows;
   determining, by a controller, a micro-flowset routing for the set of flows, the micro-flowset routing defining which of a set of directed links connecting a plurality of routing devices are used to route each of the flows from the respective ingress routing device to the respective egress routing device, wherein determining the micro-flowset routing includes:
      determining a sampling characteristic for each link of the set of directed links representing the ability of the link to sample traffic;
      determining a sampling utility for each micro-flowset representing the importance of measuring the micro-flowset, wherein the importance of measuring each micro-flowset corresponds to the importance of a destination port, the destination port being specified in a sampled data packet's Internet Protocol (IP) header; and
      maximizing, subject to routing constraints of an overall Traffic Engineering (TE) policy, a sampling resolution function representing the monitoring effectiveness of the micro-flowset routing based on the link sampling characteristics and the micro-flowset sampling utilities; and
   transmitting, by the controller, flow information to at least a first routing device of the plurality of routing devices according to the micro-flowset routing, the flow information defining which of the set of directed links are to be used to route at least one flow entering the first routing device to a second routing device of the plurality of routing devices.

2. The method according claim 1, wherein the sampling utility includes a traffic demand of the flow multiplied by an importance of sampling the flow.

3. The method according claim 1, wherein the sampling utility is inferred using historical data.

4. The method according to claim 1, wherein the routing constraints are a Least Disruption Routing (LTD) set of constraints specifying that violations of TE constraints are allowed and specifying a TE metric representing the extent to which the violations of the TE constraints are allowed.

5. The method according to claim 1, wherein the routing constraints are a No Routing Loops (NRL) set of constraints restricting the set of directed links along which micro-flowsets are routed.

6. The method according to claim 5, wherein the routing constraints are a Relaxed Sticky Routes (RSR) set of constraints that further restricts the set of directed links along which micro-flowsets are routed.

7. A system for routing-assisted traffic monitoring comprising:
- a network including a plurality of routing devices communicatively coupled by a set of directed links; and
- a controller communicatively coupled to the plurality of routing devices, the controller being configured to:
- determine a micro-flowset routing for a set of flows, each flow being a part of a macro-flowset having an associated ingress routing device and an egress routing device wherein the macro-flowset comprises a plurality of micro-flowsets, each micro-flowset comprising one or more flows, the micro-flowset routing defining which of the set of directed links are used to route each of the flows from the respective ingress routing device to the respective egress routing device, wherein determining the micro-flowset routing comprises:
    - determining a sampling characteristic for each link of the set of directed links representing the ability of the link to sample traffic;
    - determining a sampling utility for each micro-flowset representing the importance of measuring the micro-flowset, wherein the importance of measuring each micro-flowset corresponds to the importance of a destination port, the destination port being specified in a sampled data packets Internet Protocol (IP) header; and
    - maximizing, subject to routing constraints of an overall Traffic Engineering (TE) policy, a sampling resolution function representing the monitoring effectiveness of the micro-flowset routing based on the link sampling characteristics and the micro-flowset sampling utilities: and
- transmit flow information to at least a first routing device of the plurality of routing devices according to the micro-flowset routing, the flow information defining which of the set of directed links are to be used to route at least one flow entering the first routing device to a second routing device of the plurality of routing devices.

8. The system according claim 7, wherein the sampling utility includes a traffic demand of the flow multiplied by an importance of sampling the flow.

9. The system according claim 7, wherein the sampling utility is inferred using historical data.

10. An article of manufacture including a non-transitory processor-readable medium having processor-executable code encoded therein, which when executed by one or more processors, enables actions for communicating over a network including a macro-flowset representing a set of flows, the macro-flowset having an associated ingress routing device and an associated egress routing device, and wherein the macro-flowset comprises a plurality of micro-flowsets, each micro-flowset comprising one or more flows, the actions comprising:
- determining, by a controller, a micro-flowset routing for the set of flows, the micro-flowset routing defining which of a set of directed links connecting a plurality of routing devices are used to route each of the flows from the respective ingress routing device to the respective egress routing device, wherein determining the micro-flowset routing includes:
    - determining a sampling characteristic for each link of the set of directed links representing the ability of the link to sample traffic;
    - determining a sampling utility for each micro-flowset representing the importance of measuring the micro-flowset, wherein the importance of measuring each micro-flowset corresponds to the importance of a destination port, the destination port being specified in a sampled data packet's Internet Protocol (IP) header; and
    - maximizing, subject to routing constraints of an overall Traffic Engineering (TE) policy, a sampling resolution function representing the monitoring effectiveness of the micro-flowset routing based on the link sampling characteristics and the micro-flowset sampling utilities; and
- transmitting, by the controller, flow information to at least a first routing device of the plurality of routing devices according to the micro-flowset routing, the flow information defining which of the set of directed links are to be used to route at least one flow entering the first routing device to a second routing device of the plurality of routing devices.

* * * * *